United States Patent [19]
Camp, Jr.

[11] Patent Number: 6,154,656
[45] Date of Patent: Nov. 28, 2000

[54] WIRELESS COMMUNICATION DEVICE AND SYSTEM INCORPORATING LOCATION-DETERMINING MEANS

[75] Inventor: William O. Camp, Jr., Chapel Hill, N.C.

[73] Assignee: Ericsson Inc., Research Triangle Park, N.C.

[21] Appl. No.: 08/805,666

[22] Filed: Feb. 27, 1997

[51] Int. Cl.[7] .................................................. H04Q 7/20
[52] U.S. Cl. .......................................................... 455/456
[58] Field of Search .................................. 455/12.1, 403, 455/428, 430, 456, 464, 521, 522; 342/352, 357, 450, 457, 463; 370/329, 335, 465, 466, 352, 328

[56] References Cited

U.S. PATENT DOCUMENTS

| | | |
|---|---|---|
| 4,622,557 | 11/1986 | Westerfield . |
| 5,361,399 | 11/1994 | Linquist et al. ......................... 455/412 |
| 5,477,458 | 12/1995 | Loomis .................................. 342/357 |
| 5,515,419 | 5/1996 | Sheffer .................................. 455/521 |
| 5,546,445 | 8/1996 | Dennison et al. ....................... 455/456 |
| 5,570,096 | 10/1996 | Knight et al. .......................... 342/357 |
| 5,587,715 | 12/1996 | Lewis .................................... 455/12.1 |
| 5,592,173 | 1/1997 | Lau et al. ................................ 455/343 |
| 5,663,735 | 9/1997 | Eshenbach ............................. 342/357 |
| 5,666,662 | 9/1997 | Shibuya ................................. 455/456 |
| 5,675,344 | 10/1997 | Tong et al. ............................. 455/456 |
| 5,724,660 | 3/1998 | Kauser et al. .......................... 455/456 |
| 5,736,964 | 4/1998 | Ghosh et al. .......................... 455/456 |
| 5,751,244 | 5/1998 | Huston et al. ......................... 342/357 |
| 5,758,288 | 5/1998 | Dunn et al. ............................ 455/456 |
| 5,796,365 | 8/1998 | Lewis .................................... 342/357 |
| 5,818,385 | 10/1998 | Bartholomew ........................ 455/419 |

FOREIGN PATENT DOCUMENTS

| | | |
|---|---|---|
| 512 789 A2 | 11/1992 | European Pat. Off. . |
| 528 090 A1 | 2/1993 | European Pat. Off. . |
| 2 270 405 | 3/1994 | United Kingdom . |

*Primary Examiner*—William G. Trost
*Assistant Examiner*—Jean A. Gelin
*Attorney, Agent, or Firm*—Burns, Doane, Swecker & Mathis, L.L.P.

[57] ABSTRACT

A device, method and system which enables the location of a wireless communication device to be accurately determined without requiring the device to perform extensive signal processing or calculations. The wireless device frequency-converts a location-determining signal from an initial frequency to the frequency of a standard communication channel, and transmits the frequency-converted signal to a base station in a conventional manner. A location-determining receiver associated with the base station receives the location-determining signal and determines the location of the wireless communication device based on the location-determining signal.

20 Claims, 1 Drawing Sheet

WIRELESS COMMUNICATION DEVICE AND SYSTEM INCORPORATING LOCATION-DETERMINING MEANS

FIELD OF THE INVENTION

The present invention relates generally to locating wireless communication devices, particularly when a wireless communication device is located in an obstructed area. More particularly, the present invention provides a method, device and system which incorporates GPS in a wireless communication system.

BACKGROUND OF THE INVENTION

The development and refinement of wireless communication services and devices continues to occur at a extremely rapid pace. One problem associated with wireless communication devices relates to determining the physical location of a device. It can be highly desirable to locate a wireless communication device for a variety of purposes, such as when there is reason to believe that a subscriber associated with the device is experiencing an emergency situation, or when the device has been misplaced. A solution to this problem must be carefully considered within the cost, size, and power consumption limitations of wireless communication systems and devices. The problem is further compounded when the wireless communication device is located in an obstructed area, such as inside a building.

One proposed solution for determining the location of a wireless communication device is to use the wireless communication device as a transponder, the device echoing back a location-determining signal to multiple base stations. The delay in the echoed signal is used to determine the distances between the wireless communication device and each of a number of base stations. The location of the device can then be determined from the locations of the base stations and the determined distances. However, it is difficult to measure the echoed signal delay with sufficient accuracy, particularly when the wireless communication device is located in an obstructed area.

A second proposed solution is based on the well-known Global Positioning Satellite (GPS) system, and involves incorporating a GPS receiver into the wireless communication device. In the GPS system, a device whose location is to be monitored (in this case, the wireless communication device, but more typically a boat, airplane, truck, etc.) is equipped with a GPS receiver. The GPS receiver can determine its location on the earth's surface, to an accuracy of about 150 feet, based on signals transmitted to the receiver by a GPS satellite. In operation, the GPS receiver receives a time-coded location-determining signal from a first GPS satellite. The receiver determines how long it took the location-determining signal to reach the ground by comparing its departure time (from the satellite) with its arrival time (at the receiver). Based on this time differential, and assuming a transmission speed of, for example, 186,000 miles per second, the receiver calculates the distance to the first satellite (for example, 13,000 miles). Based on preprogrammed information about satellite's orbit, the receiver can determine where in space the satellite is at the time the signal is sent, and the receiver can use this information to determine that its location is somewhere on the surface of a sphere having a radius from the satellite equal to the determined distance (in this example, 13,000 miles). The receiver repeats this process using location-determining signals from additional GPS satellites, and finally determines, based on the points of intersection of the resulting spheres, where it is located.

Unfortunately, a typical GPS receiver is larger than a typical wireless communication device. Even if the GPS receiver is reduced in size, the incorporation of the GPS receiver in a wireless communication device would significantly impact the size of the device. Further, known GPS receivers typically do not have sufficient performance capabilities to determine location within an obstructed area such as inside a building.

Any solution to the problem of determining the location of a wireless communication device which involves significant signal processing operations within the wireless device will drastically affect the device's cost, power consumption, and/or performance.

Therefore, it would be highly desirable to be able to accurately determine the location of a wireless communication device, particularly when the device is located in an obstructed area such as inside a building, in a manner which does not significantly impact the cost, size, performance, or power consumption of the wireless communication device.

SUMMARY OF THE INVENTION

The present invention overcomes the above-described problems, and achieves other advantages, by providing for a wireless communication system, device, and method for determining the location of a wireless communication device which does not significantly impact the device itself. According to exemplary embodiments, the wireless communication device, which can communicate with a base station on a communication channel, is provided with location-determining circuitry for receiving a location-determining signal (e.g., a GPS signal), converting the received signal from a first frequency to a second frequency, and transmitting the frequency-converted location-determining signal on the communication channel to a location-determining receiver. The location-determining receiver is preferably a GPS receiver associated with the base station.

According to exemplary embodiments of the method of the present invention, a location-determining (e.g., GPS) signal is transmitted at a first frequency from a location-determining system to the wireless communication device. The location-determining signal is then converted from the first frequency to a second frequency by the wireless communication device, and the frequency-converted location-determining signal is transmitted at the second frequency to one or more location-determining receivers tuned to the second frequency.

To better enable the location of the wireless device to be determined when the device is located in an obstructed area, and to ensure that the location-determining signal is properly received, the transmission of the frequency-converted location-determining signal can occur at power level greater than the power level of communication signals ordinarily exchanged between the wireless device and the control station. Alternatively, or in addition to this feature, the control station associated with a location-determining receiver can temporarily suspend communication links with other wireless communication devices at the second frequency in response to receiving the frequency-converted signal, or a precursor signal transmitted by the wireless device prior to transmitting the frequency-converted signal.

The present invention enables the location of a wireless communication device to be determined without significantly impacting the size, cost, performance, or power consumption of the wireless communication device.

BRIEF DESCRIPTION OF THE DRAWINGS

The present invention can be understood more fully upon reading the following Detailed Description of the Preferred Embodiments in conjunction with the accompanying drawings, in which.

DETAILED DESCRIPTION OF THE PREFERRED EMBODIMENTS

Figure 1:
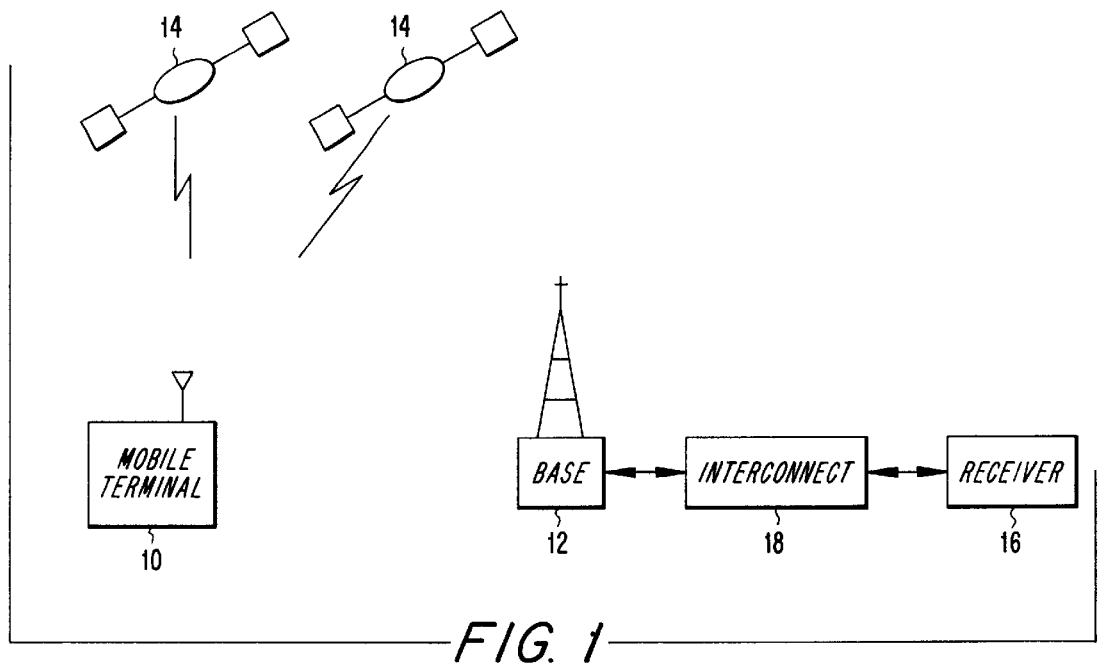
FIG. 1 is a block diagram of a wireless communication system according to an embodiment of the present invention.

FIG. 1 shows an exemplary wireless communication system according to the present invention. The system includes a plurality of mobile communication terminals such as mobile terminal 10 and a plurality of base stations such as base station 12. The mobile terminal 10 exchanges communication signals with the base station 12 in a conventional manner. For purposes of explanation, the invention will be described assuming that the mobile terminal 10 and base station 12 exchange signals according to code-division multiple access (CDMA) principles. CDMA signals have a bandwidth of approximately 1.2 MHz, and GPS signals have a bandwidth of approximately 1 MHz. However, it will be appreciated that the invention is not limited to CDMA systems, and the principles of the invention can be easily adapted to other types of communication systems.

The system of FIG. 1 operates in connection with a location-determining system, which in this example is a GPS system. The GPS system includes GPS satellites 14, and one or more GPS receivers 16. Each GPS receiver 16 is preferably associated with a base station 12, either directly or via an optional interconnection means 18. Each GPS receiver preferably includes at least two complete GPS receivers, one of which receives signals from the mobile terminal 10 via the base station 12, and the other of which receives GPS signals directly from the satellites 14. It is possible to use only one GPS receiver and multiplex it between the two functions. However, such a configuration requires a data processor to make corrections for time offsets between measurements.

In operation, when it is desired to determine the location of the mobile terminal 10, such as when the subscriber associated with mobile terminal 10 has sent a voice or data message indicating that the subscriber is experiencing an emergency situation, one or more of the GPS satellites 14 transmits a location-determining GPS signal at 1575.42 MHz. This signal is received at mobile terminal 10, which frequency-converts the GPS signal from its original frequency to a second frequency suitable for transmission on the conventional CDMA channel, and transmits the frequency-converted GPS signal to the base station 12. The frequency-conversion circuitry of the mobile terminal will be described in more detail below with respect to FIG. 2. The base station 12 relays the frequency-converted GPS signal to an associated GPS receiver 16, either directly or via optional interconnection means 18. Interconnection means 18 converts the frequency-converted GPS signal from the CDMA channel frequency to its original frequency, and can simply be an inverse version of the frequency-conversion circuitry of mobile terminal 10. If no interconnection means 18 is used, the GPS receiver 16 can be tuned to receive signals directly on the CDMA channel. The GPS receiver 16 uses the GPS signal received via base station 12, preferably in conjunction with GPS signals received from other GPS satellites, to determine the location of mobile terminal.

It will be appreciated that if the receiver 16 includes two separate GPS receivers, two additional tasks can be accomplished. First, one of the two receivers, operating in a conventional mode with normal GPS signal levels, can perform all of the functions necessary for correct location determining—i.e., demodulate the GPS signals to obtain positioning and timing information. This permits the second receiver, fed from the remote unit 10, to have relatively long integration times. The long integration time would prohibit the second receiver from performing data demodulation, but enable the second receiver to perform code synchronization in very weak signal (obstructed) conditions, while having access to the rest of the information needed to find position. Secondly, this arrangement allows the system to perform differential GPS, a method of removing residual errors. According to differential GPS, a GPS-predicted location generated by the first receiver is compared with its previously and accurately surveyed location to determine correction factors. The determined correction factors are then applied to the location-determining data generated by the second receiver to determine the location of the wireless communication device.

Figure 2:
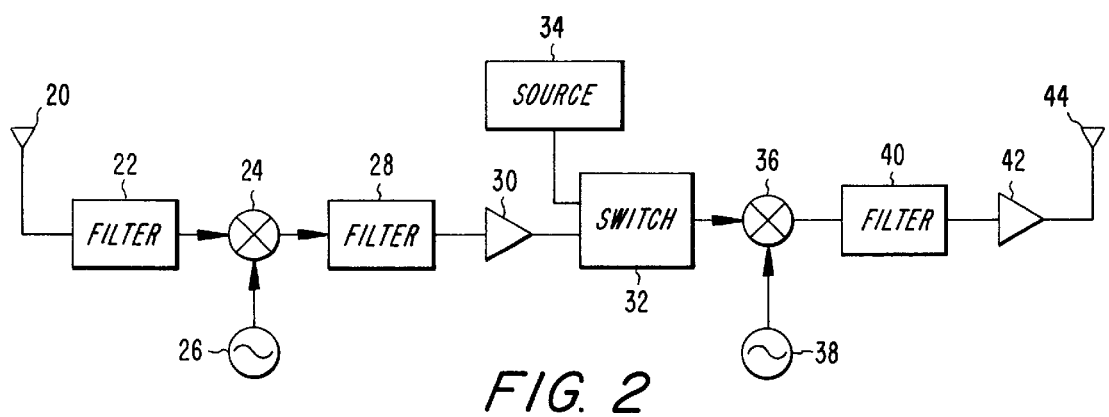
FIG. 2 is a block diagram of the transmitter circuit of a wireless communication device according to an embodiment of the present invention.

FIG. 2 is a block diagram of the transmitter portion of an exemplary wireless communication device according to the present invention. The transmitter portion includes a location-determining circuit path and a transmitter circuit path. The location-determining circuit path includes an antenna 20, a filter 22 connected to the antenna 20 for filtering location-determining signals received by the antenna 20, and a mixer 24 connected so as to receive the filtered output of filter 22 and an oscillator signal provided by oscillator 26, and provide a intermediate frequency output signal (which is at approximately the same frequency as the output of source 34, discussed below). The transmitter further includes a second filter 28 connected to an output of the mixer 24 for filtering the intermediate frequency. An amplifier 30 is connected to the filter 28, and amplifies the filtered intermediate frequency. The filtered intermediate frequency is provided as one input to a switch 32.

The transmitter circuit path includes a source 34 for supplying a modulated intermediate communication signal which carries voice, data or control information to be transmitted from the wireless communication device to the base station. The modulated intermediate communication signal is at substantially the same frequency as the intermediate frequency signal output by mixer 24. The source 34 outputs the intermediate communication signal as a second input to switch 32. The state of switch 32, which can be controlled either by the subscriber (for example, by operation of a switch or entry of a command into the wireless communication device) or by the system (for example, by a control signal sent to the wireless communication device by the base station 12), determines whether the transmitter will transmit a signal generated by the location-determining circuit path or the transmitter circuit path. The output of switch 32 is provided as a first input to a second mixer 36, which mixes the switch output of switch 32 with a second oscillator signal 38. Mixer 36 outputs a desired transmission signal which, in this example, is a CDMA communication signal at a frequency in the CDMA communication channel. The transmission signal is then filtered by a filter 40, amplified by amplifier 42, and transmitted to a control station via transmitter antenna 44. It will be appreciated that the transmitter circuit path of FIG. 2 is substantially identical to the transmitter path of a conventional wireless communication device.

In operation, the transmitter in an initial state operates to transmit communication signals (i.e., voice, data, or control signals) to one or more base stations via the transmitter path. In this initial state, the switch 32 is positioned to receive the output of source 34 and provide the output of the source 34 to the second mixer 36. If the device is placed in a location-determining mode, then a location-determining signal (e.g., a GPS signal at 1575.42 MHz) is received by antenna 20, this location-determining signal is received and frequency-converted by elements 22–30, and the state of switch 32 is changed from the initial state such that switch 32 provides the location-determining signal at the intermediate frequency to the second mixer 36. In this location-determining mode, the second mixer 36 frequency-converts the processed location-determining signal from the intermediate frequency (the frequency of the intermediate frequency signal output by mixer 26, having a bandwidth of approximately 1 MHz) to a second frequency suitable for transmission over a communication channel (e.g., a CDMA communication channel having a bandwidth of about 1.2 MHz). In this location-determining mode, the communication link established between the wireless communication device and the base station is temporarily interrupted.

In a wireless communication device incorporating the circuit of FIG. 2, assuming an appropriate gain is provided by amplifier 30, the location-determining signal is radiated, substantially unchanged other than having a different frequency, to one or more base stations by the transmitter. The transmitter can first send a precursor signal to indicate to the base station that a location-determining signal is forthcoming. The base station then uses a location-determining receiver, such as GPS receiver 16, to determine the location of the wireless device. The location-determining receiver can be tuned to the wireless communication channel frequency rather than the initial frequency of the location-determining signal, or can receive the location-determining signal at its initial frequency after circuitry such as interconnection means 18 (FIG. 1) re-converts the location-determining signal from the communication channel frequency to its initial frequency. It will be appreciated that a wireless communication device having the circuitry of FIG. 2 enables the device to incorporate a location-determining means without the necessity of performing signal processing, detection, or location calculations in the device itself.

Figure 3:
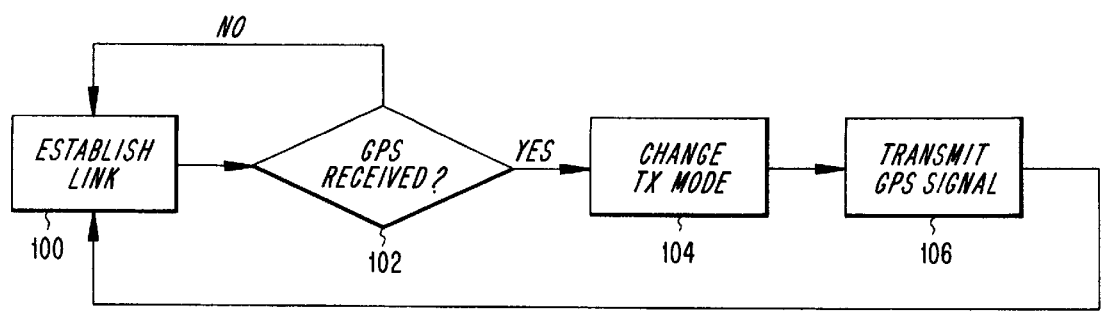
FIG. 3 is a flow chart describing the steps of determining the location of a wireless communication device according to an embodiment of the present invention.

FIG. 3 shows a flow chart describing the process for determining the location of a wireless communication device according to the present invention. In step 100, a communication link is established between a wireless communication device and a base station. While this communication link is established, communication signals (i.e., voice, data, or control signals) are exchanged in a conventional manner between the device and the base station. In step 102, the device determines whether it has received a location-determining signal, either a signal e.g. from a switch on the device, or a command from the base station via the communication link. If not, the process returns to step 100 and the conventional communication link is maintained. If a location-determining signal has been received by the wireless communication device, the device changes modes in step 104 and the switch 32 selects the location-determining circuit path rather than the standard transmitter path. As a result of this mode change, the conventional communication link is suspended. In step 106, the frequency-converted location-determining signal is transmitted from the wireless communication device to the base station in step 106. After transmission of the location-determining signal is completed (enabling suitable location-determining calculations to be performed by the location-determining receiver), the process returns to step 100, in which the conventional communication link is re-established.

As is apparent from the foregoing, the present invention provides a method, system, and device for determining the location of a device in a wireless communication system. The invention is particularly advantageous in that the device itself is not required to perform significant signal processing functions.

While the foregoing description contains many details and specificities, it is to be understood that these details and specificities are not limitations of the invention, but rather are included merely for purposes of illustration. Many modifications to the above-disclosed examples will be readily apparent to those of ordinary skill in the art which do not depart from the spirit and scope of the invention, as defined by the following claims and their legal equivalents.

What is claimed is:

1. A method for determining a location of a wireless communication device, comprising the steps of:

transmitting a location-determining signal at a first frequency from a location-determining system to the wireless communication device;

switching a transmitter path in the wireless communication device from a first transmitter path, in which the wireless communication device transmits communication signals to one or more control stations at a second frequency, to a second transmitter path, in which the wireless communication device converts the location-determining signal from the first frequency to the second frequency;

transmitting the location-determining signal at the second frequency to one or more location-determining receivers tuned to the second frequency; and determining, at the one or more location-determining receivers, the location of the wireless communication device.

2. The method of claim 1, wherein the location-determining system is a global positioning satellite (GPS) system, the location-determining signal is a GPS signal, and the location-determining receiver is a GPS receiver.

3. The method of claim 1, wherein the location-determining receivers are associated with the one or more control stations.

4. The method of claim 1, further comprising the steps of:

filtering the location-determining signal;

down-converting the filtered location-determining signal;

filtering the down-converted signal; and amplifying the down-converted signal, prior to the step of converting.

5. The method of claim 1, wherein the first frequency is approximately 1575.42 MHz, and the second frequency is a mobile radiotelephone communication frequency.

6. The method of claim 5, wherein the mobile radiotelephone communication frequency is a CDMA channel frequency.

7. The method of claim 1, wherein the transmission of the communication signals is performed at a first power level, and the transmission of the frequency-converted location-determining signal is performed at a second power level greater than the first power level.

8. The method of claim 3, further comprising the step of:

transmitting, prior to the transmitting of the frequency-converted location-determining signal, a precursor signal to the one or more control stations associated with the one or more location-determining receivers; and suspending, at the one or more control stations, communication links with other wireless communication devices at the second frequency.

9. The method of claim 1, wherein there are at least two location-determining receivers and the step of determining is performed by:

predicting a location of a first location-determining receiver;

comparing the predicted location with a known location of the first location-determining receiver to determine error correction factors; and determining a location of the wireless communication device at a second location-determining receiver using the determined error correction factors.

10. A wireless communication device, comprising:

wireless communication means for communicating with one or more control stations on one or more communication channels; and location-determining means for receiving a location-determining signal from a location-determining transmitter, and communicating with one or more location-determining receivers associated with the one or more control stations on the one or more communication channels, wherein the location determining means includes a switching means for switching a transmitter path in the wireless communication device from a first transmitter path, in which the wireless communication device transmits communication signals to the one or more control stations at a second frequency, to a second transmitter path, in which the wireless communication device converts the location-determining signal from a first frequency to the second frequency and transmits the location-determining signal at the second frequency to said one or more location-determining receivers.

11. The device of claim 10, wherein the location-determining signal is a GPS signal, the location-determining receivers are GPS receivers, and the location-determining transmitter is a GPS satellite.

12. The device of claim 10, wherein the first frequency is approximately 1575.42 MHz, and the one or more communication channels are CDMA communication channels.

13. The device of claim 10, wherein the device transmits a precursor signal prior to communicating with the location-determining receivers, the precursor signal causing each control station associated with the location-determining receivers which receive the precursor signal to suspend communication links with other wireless communication devices at the second frequency.

14. The device of claim 10, wherein the device communicates with the control stations at a first power level and communicates with the location-determining receivers at a second power level greater than the first power level.

15. A communication system, comprising:

one or more control stations associated with one or more wireless communication devices, each wireless communication device having means for exchanging communication signals with the one or more control stations on one or more communication channels; and location-determining equipment having means for transmitting a location-determining signal to a wireless communication device at a location-determining frequency, receiving a frequency-converted version of the location-determining signal from the wireless communication device, and determining the location of the wireless communication device from the frequency-converted version, wherein the wireless communication device includes a switching means for switching a transmitter path in the wireless communication device from a first transmitter path, in which the wireless communication device transmits communication signals to the one or more control stations at a first frequency, to a second transmitter path, in which the wireless communication device converts the location-determining signal from the location-determining frequency to the first frequency and transmits the location-determining signal at the first frequency to said location-determining equipment.

16. The system of claim 15, wherein the location-determining equipment includes one or more location-determining transmitters for transmitting the location-determining signal, and one or more location-determining receivers associated with the one or more control stations for receiving the frequency-converted version of the location-determining signal.

17. The system of claim 15, wherein the location-determining frequency is approximately 1575.42 MHz.

18. The system of claim 15, wherein the frequency-converted version has a frequency within one of the communication channels.

19. The system of claim 18, wherein the frequency-converted version is transmitted at a power level greater than the power level of the communication signals.

20. The system of claim 16, wherein each control station associated with a location-determining receiver suspends communication with wireless communication devices communicating on the same channel as the frequency-converted version of the location-determining signal, in response to the location-determining receiver receiving the frequency-converted version of the location-determining signal.

* * * * *